US012712142B2

(12) United States Patent
Bienert et al.

(10) Patent No.: US 12,712,142 B2
(45) Date of Patent: Aug. 18, 2026

(54) ROTOR COMPONENT FOR A ROTARY X-RAY ANODE

(71) Applicant: Plansee SE, Reutte (AT)

(72) Inventors: Christian Bienert, Reutte (AT); Michael O'Sullivan, Reutte (AT); Bernhard Lang, Reutte (AT); Dietmar Sprenger, Reutte (AT)

(73) Assignee: Plansee SE, Reutte (AT)

( * ) Notice: Subject to any disclaimer, the term of this patent is extended or adjusted under 35 U.S.C. 154(b) by 124 days.

(21) Appl. No.: 18/854,636

(22) PCT Filed: Jan. 20, 2023

(86) PCT No.: PCT/AT2023/060013
§ 371 (c)(1),
(2) Date: Oct. 7, 2024

(87) PCT Pub. No.: WO2023/193030
PCT Pub. Date: Oct. 12, 2023

(65) Prior Publication Data

US 2025/0226171 A1 Jul. 10, 2025

(30) Foreign Application Priority Data

Apr. 6, 2022 (AT) .............................. A 50064/2022

(51) Int. Cl.
*H01J 35/10* (2006.01)

(52) U.S. Cl.
CPC ..... *H01J 35/101* (2013.01); *H01J 2235/1026* (2013.01)

(58) Field of Classification Search
CPC .................................................... H01J 35/101
See application file for complete search history.

(56) References Cited

U.S. PATENT DOCUMENTS 6,113,991 A 9/2000 Salito
2002/0168051 A1* 11/2002 Lee .......................... H01J 9/02 445/28

(Continued)

FOREIGN PATENT DOCUMENTS

DE 19945414 A1 4/2001
EP 0850899 A1 7/1998

(Continued)

OTHER PUBLICATIONS

Gartner F et al, "Mechanical properties of cold-sprayed and thermally sprayed copper coatings", Aug. 1, 2006 (Aug. 1, 2006), Band {0} 200, Nr. {0} 24, pp. 6770-6782, XP024996520, DOI: 10.1016/J.SURFCOAT.2005.10.007, ISSN:0257-8972, [found on Aug. 1, 2006].

*Primary Examiner* — Edwin C Gunberg
(74) *Attorney, Agent, or Firm* — Laurence A. Greenberg; Werner H. Stemer; Ralph E. Locher

(57) ABSTRACT

A rotor component for a rotary x-ray anode has a carrier body and a spray coating. The carrier body is made from one of the following materials a refractory metal, a refractory metal-based alloy, iron, an iron-based alloy or combinations thereof, and the spray coating contains copper or a copper-based alloy. The carrier body is materially bonded to the spray coating at least in sections at a connecting surface. The rotor component is characterized in that the microstructure of the rotor component has no transition region at the connecting surface between the carrier body and the spray coating.

15 Claims, 6 Drawing Sheets

(56) References Cited

U.S. PATENT DOCUMENTS

| | | | | |
|---|---|---|---|---|
| 2008/0216602 | A1 * | 9/2008 | Zimmermann | B22F 7/08 204/192.1 |
| 2010/0015467 | A1 | 1/2010 | Zimmermann et al. | |

FOREIGN PATENT DOCUMENTS

| | | | |
|---|---|---|---|
| EP | 1432005 | A1 | 6/2004 |
| FR | 2703509 | A1 | 10/1994 |
| JP | 2000057981 | A | 2/2000 |
| JP | 2002142421 | A | 5/2002 |
| JP | 2010509502 | A | 3/2010 |
| WO | 9528731 | A1 | 10/1995 |

* cited by examiner

ROTOR COMPONENT FOR A ROTARY X-RAY ANODE

FIELD AND BACKGROUND OF THE INVENTION

The present invention relates to a rotor component for an X-ray rotating anode and to a method of manufacturing a rotor component for an X-ray rotating anode.

A rotor for an X-ray rotating anode is rotatably mounted inside a vacuum housing and is connected to the X-ray rotating anode in a rotationally fixed manner. Together with a stator, the rotor forms an electric motor which, when the stator is connected to a power supply, causes the X-ray rotating anode to rotate within the vacuum housing. The rotor for the X-ray rotating anode usually consists of a copper cylinder that encloses a tubular iron core. The disadvantage of this is that the materials required for the electrical drive have different coefficients of thermal expansion, so that they have to be attached to each other in order to withstand the temperature fluctuations that occur in the X-ray tube while maintaining a stable arrangement of the rotor.

For example, it is known from the disclosure document DE 199 45 414 A1 to apply an outer rotationally symmetrical section of a rotor (made of copper, for example) to an inner rotationally symmetrical section of the rotor (made of ferromagnetic material, e.g. steel) as a coating in order to create a material bond between the two materials. In DE 199 45 414 A1, this is done by build-up welding, in particular by laser build-up welding. In laser build-up welding, the material to be clad is applied as a powder to the base material from a nozzle with a defined mass flow and then immediately melted by continuous exposure to laser light, whereby it forms a welded joint with the base material. However, this creates a boundary layer in which the two materials mix (as the laser melts the base material locally). This boundary layer represents a discontinuity in the properties of the respective materials.

Rotor components made of ferromagnetic material (e.g. steel) with a coating of copper or a copper alloy are currently manufactured primarily by back-casting. Back-casting is the metallurgical application of a material to a carrier body, whereby the carrier body is always in a solid aggregate state with the process parameters used. During back-casting, for example, a solid, bulk-shaped carrier body consisting of steel, for example, is inserted into a graphite mould. It is then back-cast with a second material consisting of a melt of copper or a copper alloy, for example. The melting point for pure copper, for example, is 1083° C. Targeted solidification of the molten copper or copper alloy allows largely pore-free interfaces or connection surfaces to be realised with good direct bonding of the copper or copper alloy to the carrier body. This means that no further bonding surfaces need to be realised, as is the case with soldering, for example. A disadvantage of this process, however, is the relatively high temperature of the molten metal that acts on the substrate, particularly at the bonding surface between the substrate and the coating. This high temperature leads to the formation of a transition zone between the copper or copper alloy coating and the substrate. The transition zone is formed by the melting or dissolving of the substrate material in the copper or copper alloy applied by back-casting, i.e. the material on the surface of the substrate is dissolved and diffuses into the coating, so that there are no homogeneous material properties in the transition zone. In addition, individual components of the carrier body material (e.g. Fe) can diffuse beyond the transition zone into the coating and thus influence the material properties of the coating. After solidification of the copper or copper alloy, the cooled rotor component shows a microstructure (recognisable, for example, in a scanning microscope image in cross-section) consisting of a carrier body, a coating and a transition zone between the two materials. In the afore-mentioned back-casting process, once the molten copper or copper alloy has solidified, the coated rotor component is machined or reworked by turning, milling, cutting, etc. until the final component geometry is achieved. This is referred to as a "top-down" machining strategy, i.e. the direction of machining is from "top to bottom"—ablative or subtractive from the superordinate to the concrete—e.g. from the fully back-cast component by machining to the final component geometry. Due to the mechanical processing, the final geometry of the rotor component can only be realised in a rotationally symmetrical manner, as individual milling of non-rotationally symmetrical geometries is very time-consuming and cost intensive.

SUMMARY OF THE INVENTION

The object of the present invention is to provide an improved rotor component for an X-ray rotating anode, in particular a rotor component in which the electrical conductivity of both the coating and in the area of the connecting surface between the carrier body and the spray coating is improved. Furthermore, the object of the present invention is to provide an improved method for manufacturing such a rotor component.

The technical problem of the present invention is solved by providing a rotor component for an X-ray rotating anode, which has a carrier body and a spray coating, the carrier body being made of refractory metal, a refractory metal-based alloy, Fe, an Fe-based alloy or combinations thereof, and the spray coating consists of Cu or a Cu-based alloy, wherein the carrier body is material-bonded to the spray coating at least in sections at a connecting surface, characterised in that the microstructure of the rotor component has no transition zone at the connecting surface between the carrier body and the spray coating, according to the independent rotor component claim. In addition, a method for manufacturing the rotor component is given with the features of the independent method claim. Advantageous further embodiments of the invention can be found in the dependent claims, which can be freely combined with one another.

The inventors have discovered that the material properties of the bonding partners are different in the transition zone that forms between the substrate and the coating during back-casting. In addition, individual components of the substrate material can diffuse beyond the transition zone into the coating during back-casting and influence the material properties of the coating. These altered material properties (both in the transition zone and in the coating) have a negative effect when the rotor component is used. In particular, the conductivity of copper or a copper alloy in the coating produced by back-casting, as well as in the transition zone, is reduced compared to a "pure" coating (made of copper or copper alloy).

In the rotor component according to the invention, the electrical conductivity of the copper can be fully utilised, as there is no reduction in conductivity due to the presence of dissolved carrier material in the spray coating. Furthermore, the invention enables a resource-saving use of copper or copper alloy, for example by directly applying the spray coating with little or no post-processing of the coating ("bottom-up" approach during processing, i.e. during processing or production, the direction of action of the processing is build-up or additive from "bottom to top"—through small units up to the end product—in contrast to the "top-down" processing strategy mentioned above). In addition, the layer thickness of the spray coating can be reduced compared to the layer thickness in the back-casting process (conserving resources) and yet the rotor component according to the invention can achieve the same turning performance. Furthermore, the process according to the invention also makes it possible to apply Cu- or Cu-based alloy coatings to more complicated geometries or geometries for rotor components which do not necessarily have to be rotationally symmetrical.

According to the present invention, the rotor component has a carrier body and a spray coating. In particular, the rotor component must be suitable for an X-ray rotating anode in order to withstand the loads in the X-ray tube. For example, no imbalances should occur. The rotor component can be the rotating part of a rotor that drives the X-ray rotating anode. However, the rotor component can also be a component of a rotor that is connected to other components, for example with a material-bond or form-fit, in order to drive the X-ray rotating anode.

The carrier body is made of a material consisting of a refractory metal, a refractory metal-based alloy, Fe, an Fe-based alloy (including steel) or combinations thereof. Refractory metals are the refractory base metals of the 5th subgroup (vanadium, niobium and tantalum) and the 6th subgroup (chromium, molybdenum and tungsten). Their melting point is higher than that of platinum (1772° C.). Refractory metal-based alloy can be understood as a combination of several pure refractory metals (e.g. W and Mo), as well as alloys thereof (e.g. W-Re) and/or compounds thereof. In the context of the invention, a refractory metal-based alloy is understood to be an alloy which contains at least 50 wt. %, in particular at least 80 wt. %, particularly preferably at least 90 wt. % of a refractory metal or several refractory metals. Of the refractory metals, Mo and W as well as Mo-based alloys and W-based alloys are particularly suitable. In a Mo- or W-based alloy, the proportion of Mo (or W) is ≥50 wt. %, preferably ≥80 wt. %, in particular ≥90 wt. % or ≥95 wt. %. Molybdenum has a very high melting point, low thermal expansion and high thermal conductivity, which is why Mo, or a Mo-based alloy is particularly advantageous (also from a cost perspective). Tungsten has the highest melting point of all metals, a very low coefficient of thermal expansion and high dimensional stability. A carrier body made of a combination of steel and Mo with sections of steel and sections of Mo is also particularly suitable from a cost point of view.

An Fe-based alloy is understood to mean alloys with ≥50 wt. % Fe, in particular ≥80 wt. % Fe, particularly preferably ≥90 wt. % or ≥95 wt. % Fe. In particular, steel, preferably with ≥97 wt. % Fe, is favoured for the carrier body in the present invention.

The spray coating according to the invention is understood to be a coating that is applied by means of thermal spray processes, such as plasma spraying (in atmosphere, under inert gas or under low pressure), powder flame spraying, high velocity oxygen fuel (HVOF), detonation spraying (flame shock spraying), laser spraying and cold gas spraying (CGS). A common feature of all thermal spraying processes is the interaction of thermal and kinetic energy. The coating material is heated, for example in a spray torch (thermal energy) and/or accelerated to high speeds (kinetic energy). A particularly preferred coating of the present invention is the cold gas spraying (CGS) coating. An alternative embodiment is plasma spraying.

Cold gas spraying is a coating process in which powder particles are applied to a substrate with very high kinetic and low thermal energy.

The spray coating consists of Cu or a Cu-based alloy. Cu-based alloys are alloys with Cu, where Cu is the main component and the proportion of Cu is ≥50 wt. %, preferably ≥70 wt. %, particularly preferably ≥80 wt. %. Examples of copper alloys include CuZn (Cu: copper, Zn: zinc), CuZnSi (Si: silicon), CuMg (Mg: magnesium), CuAl (Al: aluminium), CuBe (Be: beryllium), CuCrZr (Cr: chromium, Zr: zirconium) and CuZr. Cu or Cu alloys typically contain unavoidable impurities. In Cu or a Cu alloy composition, these are, for example, the elements iron, nitrogen and oxygen. Carbon or hydrogen impurities are also possible. The spray coating of the present invention can therefore have corresponding impurities, in particular of the aforementioned elements. The elements oxygen, iron and nitrogen are preferably present in the spray coating according to the invention in the following maximum quantities: ≤1000 μg/g oxygen, ≤500 μg/g iron and ≤200 μg/g nitrogen. For oxygen, the preferred content is ≤500 μg/g, more preferably ≤250 μg/g, particularly preferably the oxygen content of the coating is between 5 and 210 μg/g. The nitrogen content is preferably ≤200 μg/g nitrogen, more preferably ≤100 μg/g nitrogen. The nitrogen content is particularly preferably between 0.5 and 50 μg/g. The oxygen and nitrogen content in the spray coating should be kept as low as possible. On the one hand, this can favourably influence the processability of the powder for the spray coating. On the other hand, pore formation in the spray coating is avoided. The iron content should be as low as possible and preferably ≤500 μg/g iron. More preferably, the iron content is ≤250 μg/g. The iron content of the coating is particularly preferably ≤100 μg/g, most preferably between 0.5 and 50 μg/g, as Fe dissolved in the Cu or in the Cu alloy reduces the conductivity of the spray coating.

The spray coating according to the invention preferably has a relative density of ≥95%, in particular ≥97% or 98% of the theoretical density of Cu or the Cu-based alloy. Pores can therefore also be present in the coating, the porosity is ≤2%, but preferably less than 1.5%. A high relative density ensures high electrical conductivity. The determination of density follows the principle of Archimedes, which describes the relationship between mass, volume and density of a solid immersed in liquid. The so-called buoyancy method is used to determine the weight, reduced by the buoyancy force, and the density is calculated from this and from the weight in air. The relative density is the measured density in relation to the theoretical density of the respective material. The theoretical density of a material corresponds to the density of pore-free, 100% dense material. In the present invention, the carrier body is turned out after the spray coating to determine the density, so that only the coating remains and can be measured.

The spray coating can extend over the carrier body in whole or in sections. In addition to the carrier body, the spray coating can also cover components of a rotor adjacent to the carrier body. These components can be connected to the carrier body, for example with a material bond or form-fit.

According to the invention, the carrier body is material-bonded to the spray coating at least in sections via a connecting surface. The connecting surface is located between a surface or an area of a surface of the carrier body and a surface or an area of a surface of the spray coating and connects the carrier body to the spray coating with a material bond. As a result, the carrier body is permanently and inseparably connected to the spray coating.

The rotor part according to the invention has no transition zone on the connecting surface between the carrier body and the spray coating.

According to the state of the art, a transition zone is a zone of fused interfaces or a diffusion zone, which can occur at the transition between a material of a carrier body and a material of a coating, e.g. when back-casting the carrier body with Cu or with a Cu alloy. The material is melted on the surface of the carrier body, for example due to high temperatures, and diffuses into the coating. The material of the coating also diffuses into the carrier body. For example, a Cu layer and an Fe layer can form a common layer in an intermediate transition zone (typically with a gradient of compositions with a high Fe content towards the side of the Fe layer and a high Cu content towards the side of the Cu layer), i.e. there is typically no homogeneous material in a transition zone. Such a transition zone normally forms during back-casting as described above.

"No transition zone" means that the surface structure of the substrate and the surface structure of the spray coating can be clearly demarcated, i.e. the two materials are directly adjacent to each other at a joint surface. There is basically no mass transfer between the two materials, i.e. a possible transition zone is no longer detectable or is completely absent. The surface structure of the carrier body can still have a slight surface roughness (Ra) or surface unevenness at the connecting surface (see FIG. 4*a*). Such surface roughness does not represent a transition zone, as the material of a carrier body can still be clearly demarcated from the spray coating. The roughness of the surface can be measured tactilely or optically. In the case of tactile measurement, the surface is determined with a measuring probe for roughness measurement using the tactile step method (line roughness) in accordance with DIN EN ISO 4287.

The invention described here eliminates the disadvantages identified by the inventors of the transition zone that forms between the carrier body and the coating during back casting. In addition, there is no contamination of the coating by dissolved carrier material. Material properties in the coating, such as the conductivity of copper, are severely impaired both by the occurrence of a transition zone and by possible impurities. As already explained above, "no transition zone" means that the material of the spray coating is directly adjacent to the material of the substrate at the connection surface. As a result, the electrical conductivity across the joint surface is determined solely by the material of the spray coating and the material of the carrier body, but is not negatively affected by a transition zone or impurities in the coating with typically lower electrical conductivity. Furthermore, the spray coating has the advantage that the coating thickness is low compared to the back-casting process, and more complicated geometries for rotor components can also be considered, which do not necessarily have to be rotationally symmetrical.

In a preferred embodiment of the invention, the spray coating is a cold gas spraying (CGS) coating. If the spray coating has been applied to the substrate by cold gas spraying, it can be seen under the microscope that the coating consists of individual particles. The particles in a coating applied by cold spraying show no melting phase and are still clearly recognisable in the deposited coating. The particles undergo deformation due to the high kinetic impact energy, so that the coating comprises cold-formed Cu particles or Cu-based alloy particles, at least in some areas. Cold deformation is to be understood by the metallurgical definition, namely that the particles are deformed on impact with the substrate under conditions (temperature/time) that do not lead to recrystallisation. A cold-worked structure is characterised by a characteristic dislocation structure, as is familiar to every expert and is also described in detail in specialist books. The dislocation structure can be visualised using TEM (transmission electron microscopy), for example.

The cold-formed particles of the coating are at least partially elongated in a direction parallel to the surface of the substrate (in the lateral direction), whereby the average (mean value of at least 100 elongated grains) grain aspect ratio (GAR; corresponds to length divided by width of the grains) is >1. The aspect ratio is determined metallographically by analysing the image using a line section method (see ASTM E112-96). For this purpose, sections are first produced which are embedded in an embedding agent, for example an epoxy resin. After a curing time, the samples are prepared metallographically, i.e. the cross-section can be analysed later. The preparation comprises the following steps: grinding, e.g. with bonded SiC paper with grit sizes between 220 and 1200; polishing with a diamond suspension with a grit size of 3 μm; final polishing with an OPS (oxide polishing suspension) with a grit size of 0.04 μm; cleaning of the samples in an ultrasonic bath and drying of the samples. The cross-sections are then etched. Scanning electron microscopy is used to determine the aspect ratio via the width-to-height ratio of the particles.

In a further embodiment of the invention, the spray coating is recrystallised or recovered by annealing after the cold spray coating and has a fine-grained and more equiaxed microstructure, which differs significantly from a coating by back-casting. After annealing, the cold spray coating shows a recrystallised microstructure of the Cu particles or Cu-based alloy particles with an average grain size of ≤150 μm, preferably ≤100 μm, more preferably ≤50 μm, particularly preferably between 1 μm and 10 μm. The average grain size can be easily analysed using a line section method on an optical microscope image of a longitudinal metallographic section (forming direction and normal direction span the image plane). For this purpose, the longitudinal section is prepared by etching in order to visualise the grain boundaries. At 500× magnification (image section 240×100 μm), five lines are placed in the image at equidistant distances from edge to edge and the maximum grain size is measured in both directions (forming and normal direction) and the mean value ((a+b)/2) is taken. Recrystallisation increases the electrical conductivity of the rotor component according to the invention. In addition, the layer adhesion of the copper or the Cu-based alloy to the carrier material is improved.

The thickness of the spray coating is preferably between 0.025 mm and 5 cm. In particular, the thickness is advantageously between 0.1 mm and 4 mm, more preferably between 0.5 mm and 2 mm, particularly preferably between 0.8 mm and 1.2 mm. The layer can be made up of a single layer or preferably a plurality of layers. The layer thickness can be determined using a scanning electron microscope. A metallographic section is taken perpendicular to the plane of the intermediate layer and the layer thickness is then measured under a scanning electron microscope at a suitable magnification. The layer thickness should be determined at representative points on the section. At least ten different, representative points should be analysed with regard to their coating thickness and an average value should be determined, which provides a value for the average thickness of the coating.

According to a further advantageous embodiment of the invention, the spray coating has an electrical conductivity of ≥26 MS/m (megasiemens per metre). Preferably, the electrical conductivity is ≥40 MS/m, more preferably ≥50 MS/m, particularly preferably ≥55 MS/m. The electrical conductivity is measured in accordance with DIN EN 16813 (2017).

The rotor component according to the invention shows good adhesive strength of the spray coating. The adhesive strength was measured in accordance with ASTM C633-13 (2016). The adhesive strength of the rotor component according to the invention is >10 MPa, preferably >20 MPa.

The present invention also relates to a method for manufacturing a rotor component for an X-ray rotating anode, which has a carrier body and a spray coating, and is characterised by the following steps:

- Providing a carrier body consisting of refractory metal, a refractory metal-based alloy, Fe, an Fe-based alloy or combinations thereof,
- Coating of the carrier body by means of spray coating using a powdery coating material, so that a rotor component with an at least sectionally material-bonding connection at a connecting surface between carrier body and spray coating is produced, wherein the spray coating consists of Cu or a Cu-based alloy, and wherein a microstructure of the rotor component has no transition zone at the connecting surface between carrier body and spray coating.

With the method according to the invention for manufacturing a rotor component, the advantages explained above in relation to the component according to the invention are achieved reliably and with process reliability. Furthermore, the advantageous embodiments of the invention mentioned above are also advantageous for the method according to the invention.

It is particularly preferable for the spray coating to be applied using cold gas spraying (CGS). As described above, powder particles with very high kinetic energy and low thermal energy are applied to a carrier body. A process gas under high pressure (e.g. air, helium (He), nitrogen ($N_2$), water vapour or mixtures thereof) is expanded using a convergent-divergent nozzle (also known as a supersonic nozzle). A typical nozzle shape is the Laval nozzle. Depending on the process gas used, gas velocities of 300 to 1200 m/s (metres per second) (for $N_2$) or up to 2500 m/s (for He) can be achieved. The coating material is injected into the gas flow, for example upstream of the narrowest cross-section of the convergent-divergent nozzle, which forms part of the spray gun, typically accelerated to a speed of 300 to 1200 m/s and deposited on a carrier body. Heating the gas upstream of the convergent-divergent nozzle increases the flow velocity of the gas and thus also the particle velocity as the gas expands in the nozzle. Typically, a gas temperature of room temperature (RT), in particular 20° C., to 1000° C. is used for cold gas spraying according to the invention. Cold gas spraying can be used in particular to spray ductile materials with a face-centred cubic and hexagonally close-packed lattice to form dense, well-adhering layers. As a rule, cold spraying is used to apply a metallic layer to a metallic substrate. In cold gas spraying, the coating is built up layer by layer from the individual particles of the coating material. The adhesion of the coating material to the substrate and the cohesion between the particles of the coating material are decisive for the quality of a cold gas spray coating. In principle, adhesion, both in the area of the bonding surface of the coating material/substrate and between the particles of the coating material, is a combination of several physical and chemical adhesion mechanisms. Due to the low process temperature, the powder is not melted during cold gas spraying, but instead hits the substrate to be coated in a non-melted state, causing a layer to build up. The high kinetic energy, due to the high speed of the powders moving in the gas flow, causes a mechanical interlocking when the powders hit the surface of the substrate, whereby the interlocking is supported by the process temperature. Coatings produced in this way using cold gas spraying can be recognised under the microscope by the fact that the coating consists of individual particles that have a "pancake" shape (i.e. a structure in which the lengths and widths of the individual grains are large compared to their thicknesses). The particles undergo deformation due to the high kinetic impact energy and show an aspect ratio greater than 1.

According to an advantageous manufacturing process of the invention, cold gas spraying is carried out at a pressure between 10 and 100 bar, preferably between 20 and 80 bar, particularly preferably between 30 and 60 bar, at a gas temperature between room temperature (RT) and 1000° C. (room temperature is particularly at 20° C.). The gas temperature is preferably between 300 and 1000° C., particularly preferably between 400 and 800° C.

According to an advantageous manufacturing method of the invention, the rotor component is annealed in a vacuum or in a protective gas atmosphere after the coating step. This process step improves the electrical conductivity of the coating and reduces residual stresses in the coating. Preferably, the rotor component is annealed at 400 to 750° C. for up to 5 hours. Further preferred is annealing at 500 to 600° C. for 0.5 to 3 hours.

According to an advantageous manufacturing method of the invention, it is provided that the carrier body is surface-treated before the coating step. This can be a chemical or physical surface treatment. This can be a surface treatment with alcohol, blasting, etc. A surface treatment using a powder jet is preferred. This enables better adhesion of the cold spray coating to the substrate.

The method according to the invention, as well as its preferred embodiments, achieve the following positive effects, among others:

- improved conductivity of the spray coating of the rotor component;
- Reduction of the layer residual stress and improved adhesion of the spray coating;
- no transition zone between the carrier body and the spray coating, which leads to improved conductivity across the connecting surface between the carrier body and the spray coating.

The coating material is made up of particles. A large number of particles are referred to as powder. A large number of powder particles can be converted into powder granules by granulation. The size of the powder particles or powder granulate particles is referred to as the particle size and is usually measured using laser diffractometry. The measurement results are given as a distribution curve. The $d_{50}$ value indicates the average particle size. $D_{50}$ means that 50% by volume of the particles are smaller than the specified value.

Furthermore, it is advantageous if the particles have a particle size $d_{50}$ of ≥5 μm and ≤150 μm. The $d_{50}$ value is measured by laser diffractometry using the standard (ISO 13320-2009). Other advantageous ranges are 10 μm≤$d_{50}$≤100 μm or 15 μm≤$d_{50}$≤80 μm.

According to an advantageous manufacturing process of the invention, the spray coating can be applied in several layers of the powdered Cu or several layers of the powdered Cu-based alloy. The final thickness of the coating is between 25 μm and 5 cm. The thickness of the coating is determined using conventional metallographic methods.

Further advantages and usefulness of the invention are shown in the following description of embodiments with reference to the attached figures.

DETAILED DESCRIPTION OF THE INVENTION

Figure 1:
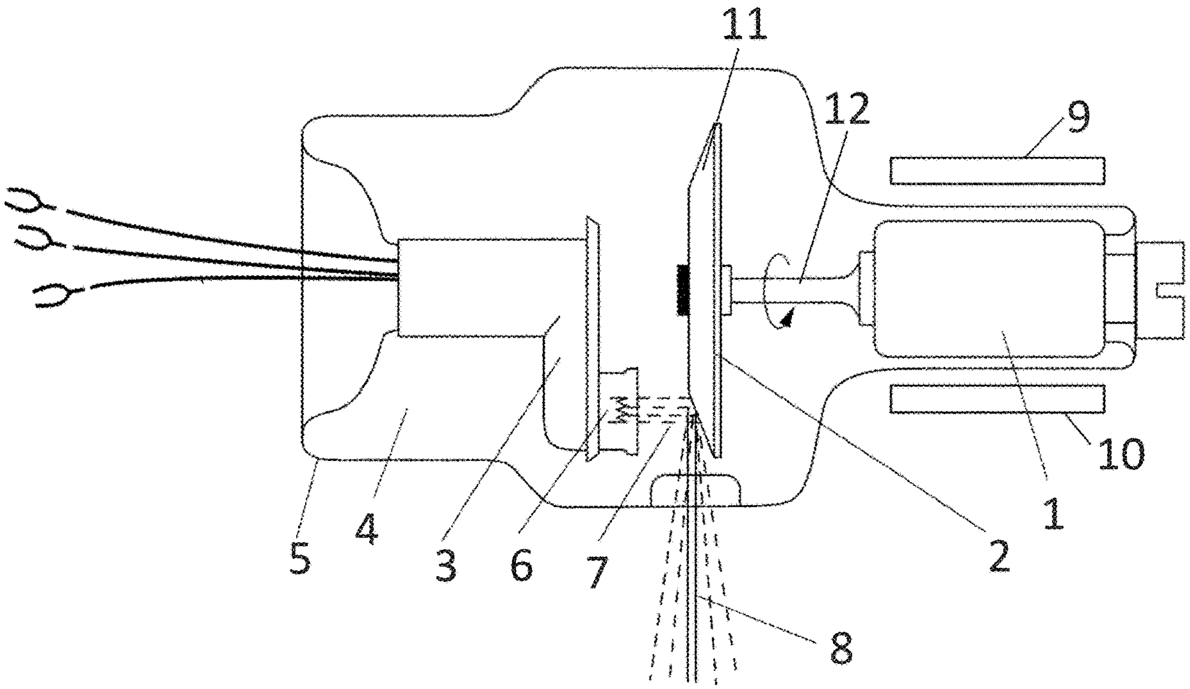
FIG. 1: Schematic representation of an overview image of an X-ray tube with an X-ray rotating anode in longitudinal section according to the state of the art.

FIG. 1 shows a longitudinal section of an X-ray tube with a rotor and an X-ray rotating anode as known in the prior art. An X-ray tube usually consists of a glass bulb (5) with a vacuum interior (4). The glass bulb contains a cathode (3) with a heating coil (6) which emits electrons (7). Opposite the cathode (3) is the X-ray rotating anode (2), which comprises an anode disc (11) that is connected to the rotor (1) of an electric motor by a shaft (12). A stator (9, 10) is arranged outside the glass bulb (5) to drive the rotor. When connected to electricity, the stator (9, 10) generates a magnetic field rotating around the glass bulb (5), which exerts a torque on the rotor (1) and thus causes the X-ray rotating anode (2) to rotate. The rotor (1) and the X-ray rotating anode (2) are located in a high vacuum (4) in a glass flask (5). The electrons (7) emitted by the cathode (3) are accelerated towards the anode disc and, when they hit the anode disc, generate X-rays (8) by deceleration, which leave the X-ray tube through a radiation window in the glass bulb.

EXAMPLES

Sample no. 1 was produced using the back-casting process in accordance with the state of the art. A steel tube with a composition of 0.08-0.15 wt. % C, 1.00 wt. % Si, 1.50 wt. % Mn, 0.040 wt. % P, 0.030 wt. % S, 11.5 to 13.5 wt. % Cr, balance Fe and usual impurities with a length of 103 mm, an outer diameter of 62 mm and an inner diameter of 44 mm was provided for this purpose. This steel tube was inserted into a graphite mould and then back-cast with a copper melt (with at least 99.95 wt. % Cu, the remainder being the usual impurities, max. 0.05 wt. % in total). The steel tube was then turned so that the copper coating (on the outer sheath surface of the steel tube) had a thickness of 2 mm.

For sample no. 2 according to the invention, Cu powder was provided with 99.95 atomic % Cu and 28 μg/g C, <10 μg/g Fe, 4 μg/g H, <5 μg/g N and 201 μg/g O. The average particle size $d_{50}$ was 26.53 μm. A steel component with a composition of 0.20-0.22 wt. % C, 0.55 wt. % Si, 1.60 wt. % Mn, 0.025 wt. % P, 0.025 wt. % S, 0.55 wt. % Cu, remaining Fe and usual impurities with a diameter of 25 mm and a height of 7 mm was provided and the surface was pre-cleaned. The steel component was then coated with the Cu powder using the cold gas spraying process. The following cold gas spraying process parameters were used: Pressure 32 bar, gas temperature 400° C., process gas $N_2$. After coating, the sample was annealed at 550° C. for 1 h in a high vacuum. The coating was turned down to 1 mm, so that the total thickness of the sample was 8 mm.

The electrical conductivity of the coating was then measured in accordance with DIN EN 16813 (2017). Sample no. 1 had a conductivity of 24 MS/m. The electrical conductivity of sample no. 2 was 56 MS/m. In pure copper, the electrical conductivity is 58 MS/m (according to IACS). Consequently, the cold gas spray-coated steel component has almost twice the conductivity of the steel component produced by back-casting. In addition, the sample according to the invention has approximately the electrical conductivity of pure copper.

In addition, the adhesion strength of the copper spray coating to the steel component of sample no. 2 was tested. These tests were carried out in accordance with ASTM C633-13 (2013). This resulted in good coating adhesion values with an adhesive strength>16 MPa.

To analyse the interface and the applied coating, polished sections were created whose image surface is at a 90° angle to the coating plane and thus depict the two base materials and their interface. These polished sections were examined under a scanning electron microscope at 100× and 500× magnification and images were taken. On the other hand, light microscope images of the polished sections were also taken, in which the sections were etched beforehand to show the grain structure of the spray coating.

Figure 2:
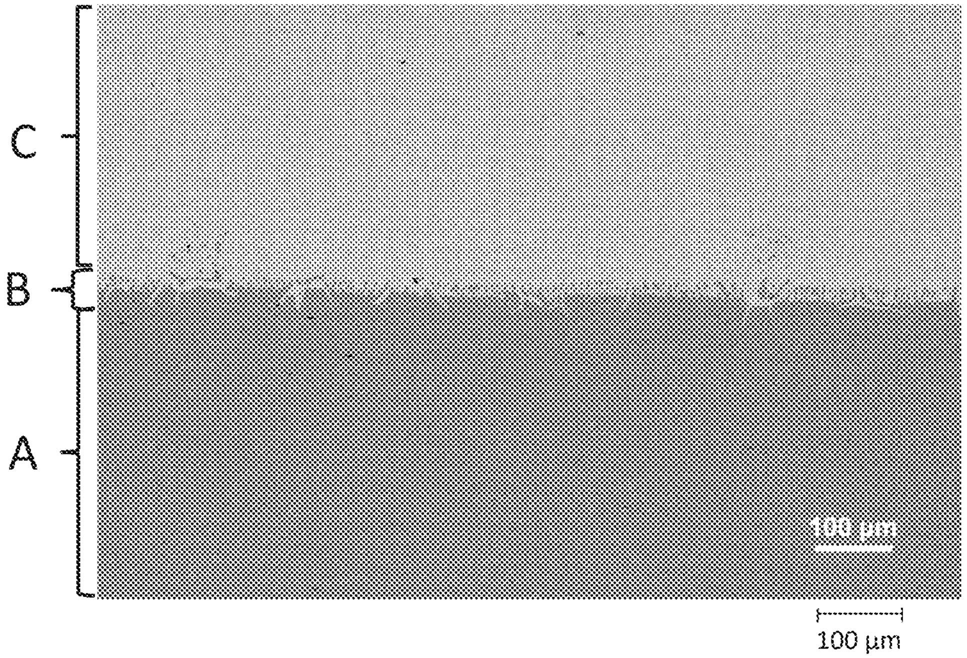
FIG. 2: Scanning electron microscope image of the transition zone between the steel body and copper in sample no. 1 (100× magnification) according to the state of the art.

FIG. 2 shows the transition from steel to copper coating in a scanning electron micrograph in cross section of sample no. 1 of the example (Cu back casting on steel) according to the state of the art with a magnification of 100×. FIG. 2 shows the steel body (A, dark area) in the lower half of the image and the copper coating (C, light area) in the upper half of the image. The copper coating is bonded to the steel over the entire surface via a transition zone (B) and the loosening of the steel surface due to the back-casting with copper is clearly visible. The transition zone (B) shows an approximate thickness of approx. 50 μm. It can be clearly seen that the copper coating has penetrated the surface of the steel and that there are also steel components in the copper coating, i.e. both materials diffuse into each other and there are no homogeneous material properties in the transition zone.

Figure 3:
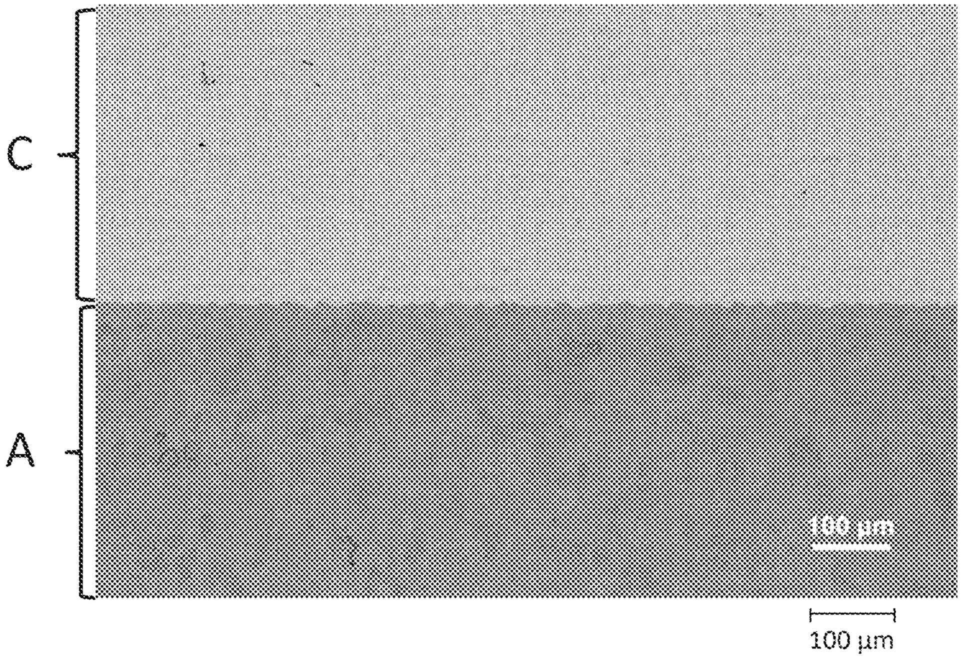
FIG. 3: Scanning electron microscope image of the transition zone between the steel body and copper in sample no. 2 according to the invention (100× magnification)

FIG. 3 shows the transition from steel to copper coating in a scanning electron micrograph in cross-section of sample no. 2 of the example according to the invention (cold gas spray coating on steel) at a magnification of 100×. FIG. 3 shows the steel body (A, dark area) in the lower half of the image and the copper coating (C, light area) in the upper half of the image. The bonding of the copper coating to the steel is complete over the entire surface and no mixing of the materials can be recognised, i.e. there is no transition zone.

Figure 4A:
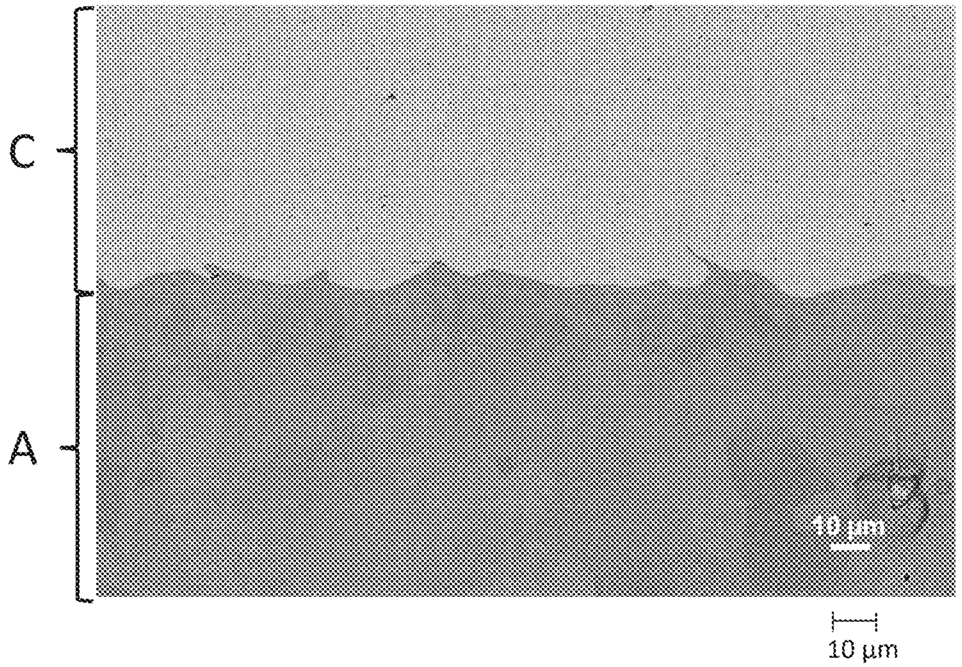
FIG. 4*a*: Scanning electron microscope image of the transition zone between the steel body and copper in sample no. 2 according to the invention (500× magnification)

FIG. 4*a* is an enlarged image of FIG. 3 and also shows the transition from steel to the copper coating in a scanning electron microscope image in cross-section of sample no. 2 of the example according to the invention (cold gas spray coating on steel) at a magnification of 500×. FIG. 4*a* shows the steel body (A, dark area) in the lower half of the image and the copper coating (C, light area) in the upper half of the image. The surface of the steel is clearly recognisable and exhibits unevenness. These irregularities can be caused either by the surface treatment of the steel before cold spraying or by the impact of the copper on the steel surface. In the figure shown, the surface unevenness amounts to a maximum of 10 μm. However, it can be clearly seen that the steel surface has not been dissolved and no mixing of the materials has taken place. There is a clear demarcation between the steel body (A) and the copper coating (C).

Figure 4B:
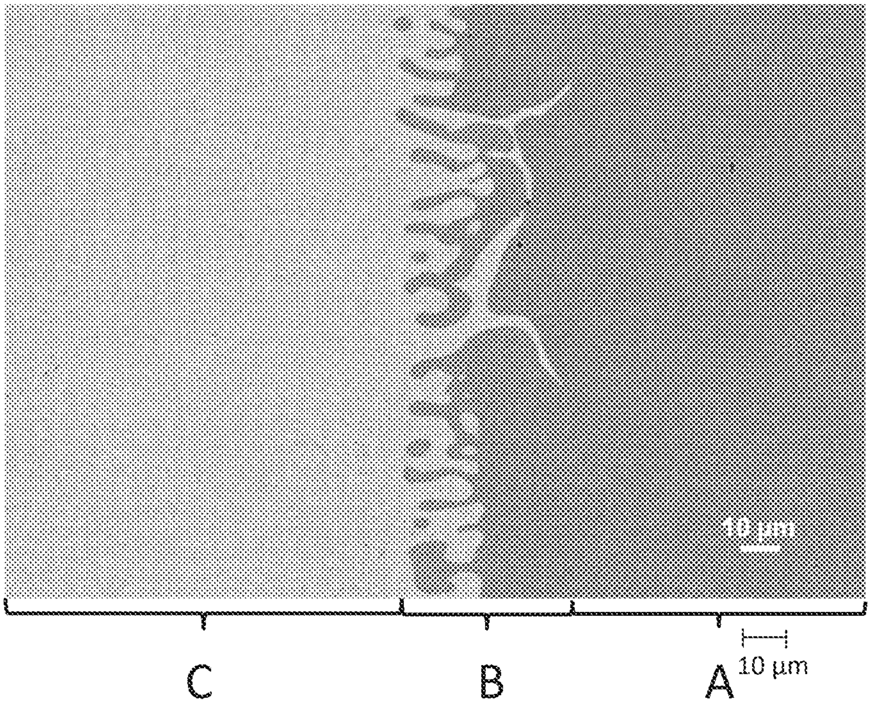
FIG. 4*b*: Scanning electron microscope image of the transition zone between the steel body and copper in sample no. 1 (500× magnification) according to the state of the art.

FIG. 4*b* is an enlarged image of FIG. 2 and also shows the transition from steel to copper coating in a scanning electron microscope image in cross-section of sample no. 1 of the example (Cu back casting on steel) according to the state of the art with a magnification of 500×. FIG. 4*b* shows the steel body (A, dark area) in the right half of the image and the copper coating (C, light area) in the left half of the image. The transition zone (B) is clearly recognisable. The copper has partially penetrated deep into the steel surface. The steel surface shows clear signs of melting, meaning that there is steel in the copper layer.

Figure 4C:
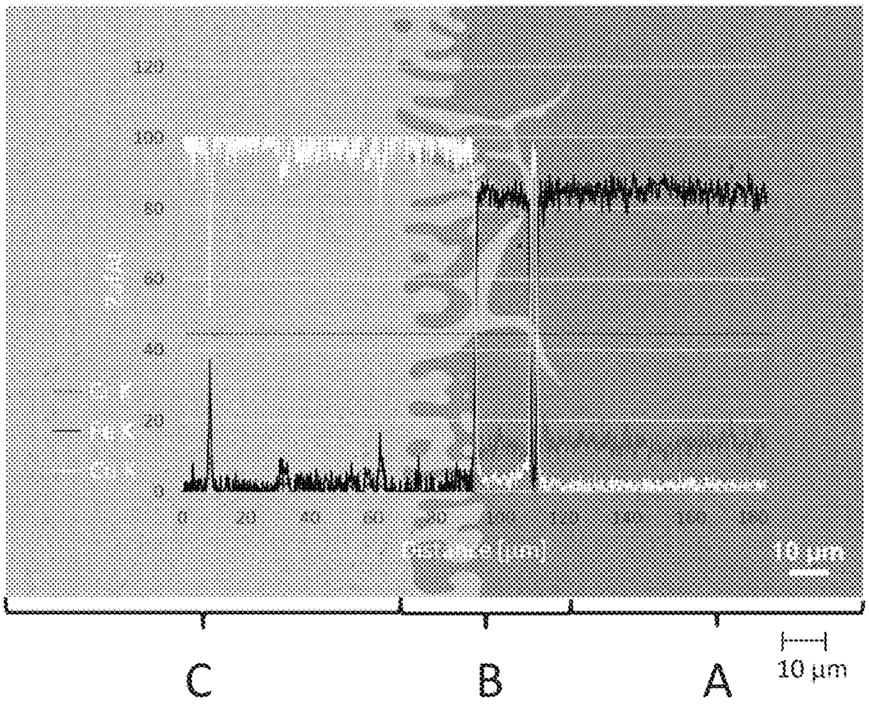
FIG. 4*c*: Line scan of the transition zone between the steel body and copper based on FIG. 4*b;*

FIG. 4*c* shows a line scan of the transition zone from copper to steel based on FIG. 4*b*. For this purpose, the element concentrations of the elements chromium, iron and copper are measured along a line starting from the copper coating (C, light area) in the direction of the steel body (A, dark area). The peak intensities after excitation with the Cu K(alpha) line used for evaluation are corrected iteratively in relation to the atomic number, the absorption and the fluorescence in this method and thus provide the possibility of a standard-free quantitative calculation of the element composition (in atomic %). It can be clearly seen that in the area of the transition zone (B), high quantities of iron are present in the copper coating and high quantities of copper have penetrated deep into the surface of the steel body. The high Cu content in the area of the Cu layer (C) before the transition zone (B) and the high Fe content in the steel body (A) after the transition zone (B) are clearly recognisable. In the area of the Cu layer (C), higher Fe contents are also recognisable (especially in comparison to the Cu contents in the steel body (A)). This shows that Fe can also penetrate beyond the transition zone into the Cu coating (C). It can also be seen that the steel body also contains a proportion of chromium.

Figure 5:
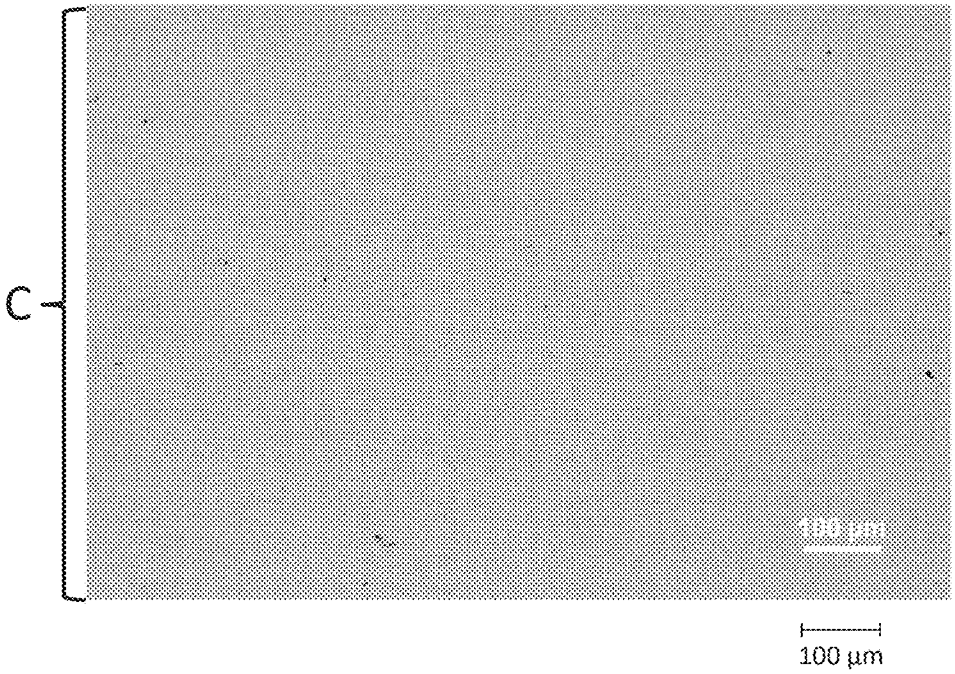
FIG. 5: Scanning electron microscope image of the copper coating on sample no. 2 according to the invention (100× magnification) before the annealing step.

FIG. 5 shows a copper coating (C) in a scanning electron micrograph in cross-section of sample no. 2 of the example according to the invention (cold spray coating on steel) before the annealing step with a magnification of 100×. The copper coating shows a homogeneous layer with a density of ≥97% (97-98.66%) of the theoretical density of copper. Individual layers are not recognisable.

Figure 6:
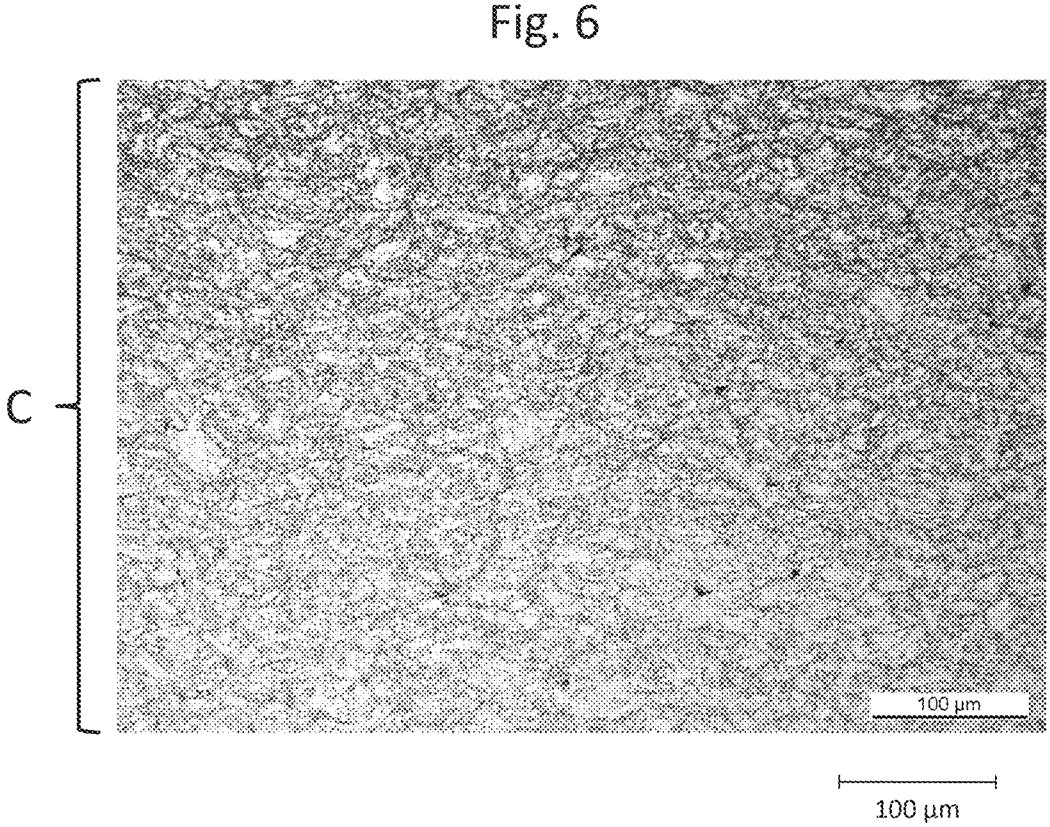
FIG. 6: Light microscope image of the copper coating on sample no. 2 according to the invention (200× magnification) before the annealing step after etching.

FIG. 6 shows the copper coating (C) in an optical microscope image in cross-section of sample no. 2 of the example according to the invention (cold gas spray coating on steel) before the annealing step at a magnification of 200×. The grain boundaries were emphasised by etching the Cu particles so that the microstructure is clearly visible. The elongated shape of the Cu particles and the many layers can be recognised. This coating is clearly different from a Cu coating using back-casting (see FIG. 9).

Figure 7:
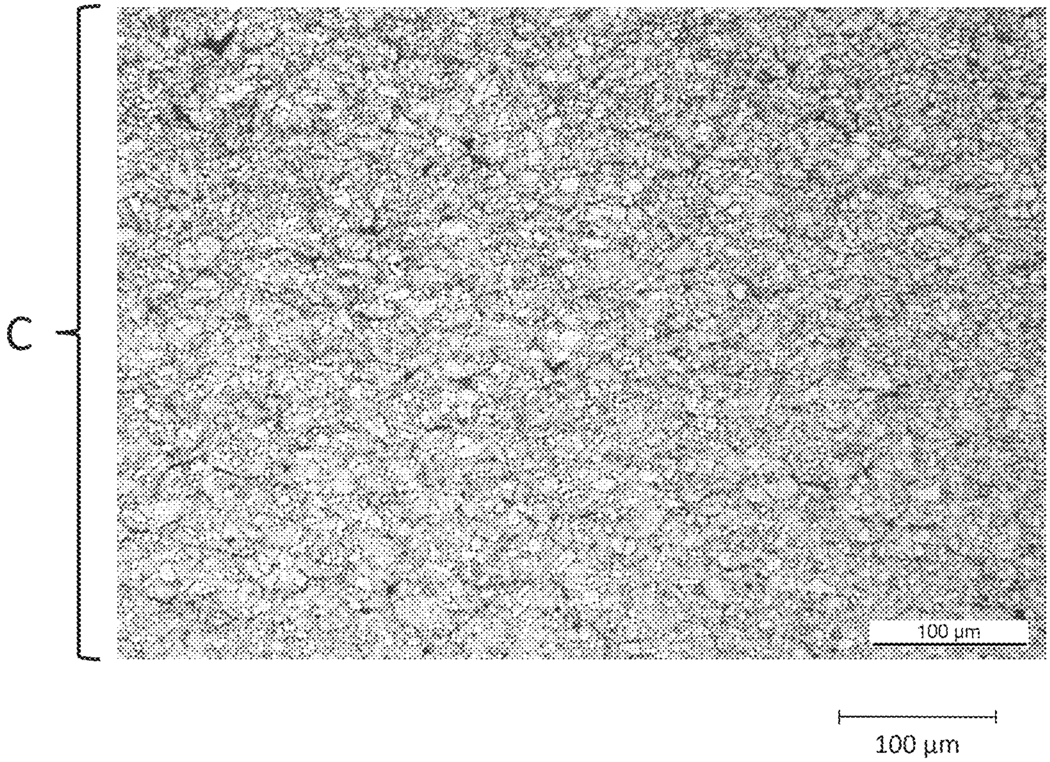
FIG. 7: Light microscope image of the copper coating on sample no. 2 according to the invention (200× magnification) after the annealing step and after etching.

FIG. 7 shows the copper coating (C) in an optical microscope image in cross-section of sample no. 2 of the example according to the invention (cold gas spray coating on steel) after the annealing step with a magnification of 200×. The grain boundaries were emphasised by etching the Cu particles so that the microstructure is clearly visible. The fine-grained and equiaxed microstructure of the coating can be recognised.

Figure 8:
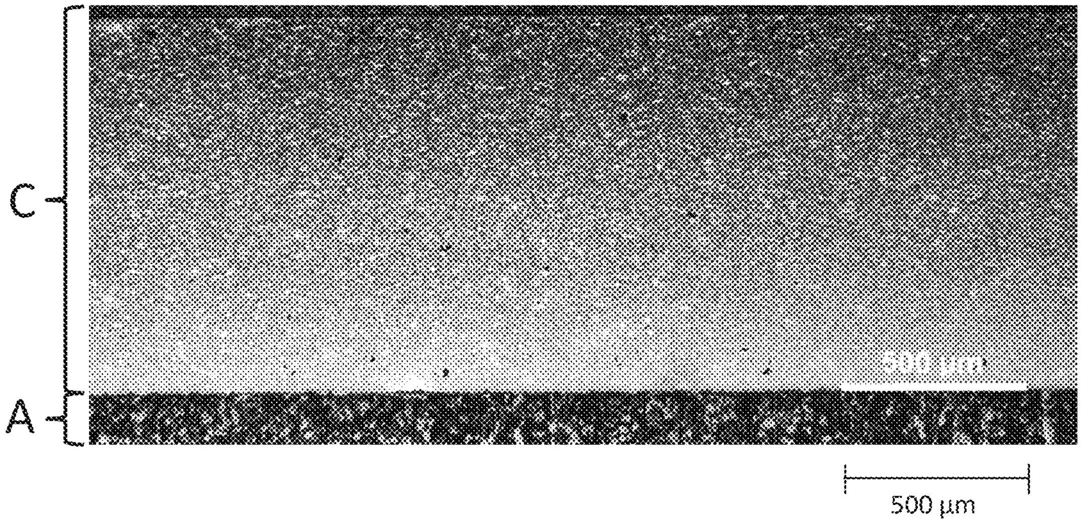
FIG. 8: Light microscope image of the copper coating on sample no. 2 according to the invention after annealing and etching (50× magnification)

FIG. 8 shows a copper coating (C) in an optical microscope image in cross-section of sample no. 2 of the example according to the invention (cold gas spray coating on steel) after the annealing step with a magnification of 50×. This low magnification was chosen in order to have a direct comparison with the grain size in the back-casting process. After etching the Cu particles, a fine-grained and uniform microstructure of the copper coating (C) can be recognised. The steel body (A, dark area) can also be recognised.

Figure 9:
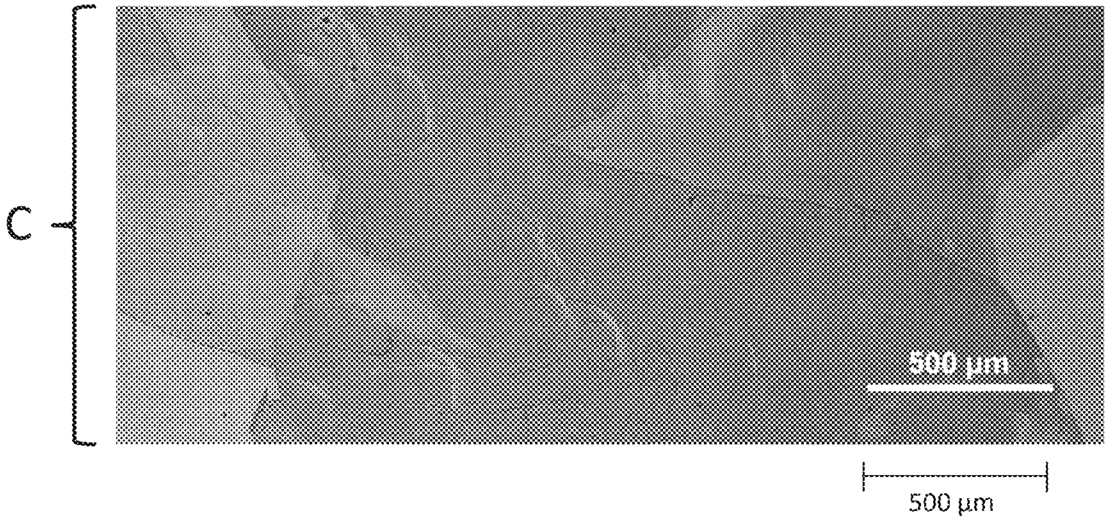
FIG. 9: Light microscope image of the copper coating on sample no. 1 (50× magnification) according to the state of the art after etching.

FIG. 9 shows a copper coating (C) in an optical microscope image in cross-section of sample no. 1 of the example (Cu back-casting on steel) according to the state of the art with a magnification of 50×. After etching the copper particles, it can be clearly seen that a large-grained structure of the copper coating is formed during back-casting.

The invention claimed is:

1. A rotor component for an X-ray rotating anode, the rotor component comprising:

a carrier body formed from a material selected from the group consisting of: a refractory metal, a refractory metal-based alloy, Fe, an Fe-based alloy and combinations thereof; and a spray coating containing Cu or a Cu-based alloy, wherein said carrier body is material-bonded to said spray coating at least in sections at a connecting surface, a microstructure of the rotor component having no transition zone at said connecting surface between said carrier body and said spray coating.

2. The rotor component according to claim 1, wherein said spray coating is a cold gas spray coating.

3. The rotor component according to claim 2, wherein said cold gas spray coating includes cold-formed Cu particles or Cu-based alloy particles at least in certain areas, which are at least partially stretched parallel to a surface of said carrier body and have a stretching ratio of >1.

4. The rotor component according to claim 3, wherein said cold gas spray coating after annealing has a recrystallized microstructure of said cold-formed Cu particles or said Cu-based alloy particles with an average grain size of ≤150 μm.

5. The rotor component according to claim 1, wherein said spray coating is a Cu spray coating or a Cu-based alloy spray coating which has ≤1000 μg/g oxygen, ≤500 μg/g iron and ≤200 μg/g nitrogen.

6. The rotor component according to claim 1, wherein said spray coating has a layer thickness of between 25 μm and 5 cm.

7. The rotor component according to claim 1, wherein said spray coating has an electrical conductivity of ≥26 MS/m.

8. The rotor component according to claim 1, wherein said spray coating has a density of ≥90% of a theoretical density of the Cu or of the Cu-based alloy.

9. A method of manufacturing a rotor component for an X-ray rotating anode, the rotor component having a carrier body and a spray coating, which comprises the following steps of:

providing the carrier body formed from a material selected from the group consisting of: a refractory metal, a refractory metal-based alloy, Fe, an Fe-based alloy and combinations thereof; and coating the carrier body by means of the spray coating having a powdery coating material, so that the rotor component has an at least partially material-bonded connection at a connecting surface between the carrier body and the spray coating being produced, wherein the spray coating contains Cu or a Cu-based alloy, and wherein a microstructure of the rotor component has no transition zone at the connecting surface between the carrier body and the spray coating.

10. The method according to claim 9, which further comprises applying the spray coating by means of cold gas spraying.

11. The method according to claim 10, which further comprises performing the cold gas spraying at a pressure of 10 to 100 bar and at a gas temperature of room temperature to 1000° C.

12. The method according to claim 9, which further comprises annealing the rotor component in a vacuum or in a protective gas atmosphere after the coating step.

13. The method according to claim 12, which further comprises performing the annealing of the rotor component at 400 to 750° C. for up to 5 hours after the coating step.

14. The method according to claim 9, which further comprises surface-treating the carrier body before performing the coating step.

15. The method according to claim 9, wherein the powdery coating material containing the Cu or the Cu-based alloy has a powder particle size of between 5 and 150 μm.

* * * * *